United States Patent [19]

Kieffer

[11] Patent Number: 4,494,759
[45] Date of Patent: Jan. 22, 1985

[54] SEAL FOR RELATIVELY ROTATABLE PARTS

[76] Inventor: Robert A. Kieffer, 118 Meadowview La., Williamsville, N.Y. 14221

[21] Appl. No.: 546,915

[22] Filed: Oct. 31, 1983

[51] Int. Cl.³ .......................... F16J 15/32; F16J 15/34
[52] U.S. Cl. ........................................ 277/25; 277/84; 277/92; 277/177; 277/178; 277/206 R
[58] Field of Search .................. 277/25, 84, 92, 95, 277/177, 178, 206 R, 206 A

[56] References Cited

U.S. PATENT DOCUMENTS

| | | | |
|---|---|---|---|
| 2,181,537 | 11/1939 | Schmitter | 277/178 X |
| 3,504,917 | 4/1970 | Malmstrom | 277/25 |
| 3,511,511 | 5/1970 | Voitik | 277/25 X |
| 3,703,296 | 11/1972 | Malmstrom | 277/25 |
| 4,179,130 | 12/1979 | Fass et al. | 277/84 |
| 4,204,716 | 5/1980 | Baylor | 277/92 X |

FOREIGN PATENT DOCUMENTS

| | | | |
|---|---|---|---|
| 1801320 | 7/1969 | Fed. Rep. of Germany | 277/178 |
| 899609 | 8/1944 | France | 277/178 |
| 679481 | 9/1952 | United Kingdom | 277/206 |
| 827564 | 2/1960 | United Kingdom | 277/178 |
| 952370 | 3/1964 | United Kingdom | 277/25 |

Primary Examiner—Robert S. Ward
Attorney, Agent, or Firm—Christel, Bean & Linihan

[57] ABSTRACT

A seal for sealing the clearance between a shaft and two close annular surfaces through which the shaft passes is in the form of a ring-like body having a central portion and two lip portions extending therefrom and hingedly movable thereto and which when the seal is mounted upon the shaft is placed in a deformed condition and in sealing engagement around the shaft. The body is of such cross-sectional shape that when stretched from an undeformed condition to a deformed condition about the shaft, each lip portion moves from a first angular position to a second angular position relative to the midplane of the body. When the seal is operatively placed upon a shaft so that each lip portion is placed in contact with a corresponding annular surface through which the shaft passes and each lip portion is thereby prevented from moving completely to its second angular position, the lip portions are axially biased into sealing engagement with the annular surfaces.

23 Claims, 8 Drawing Figures

U.S. Patent  Jan. 22, 1985  4,494,759
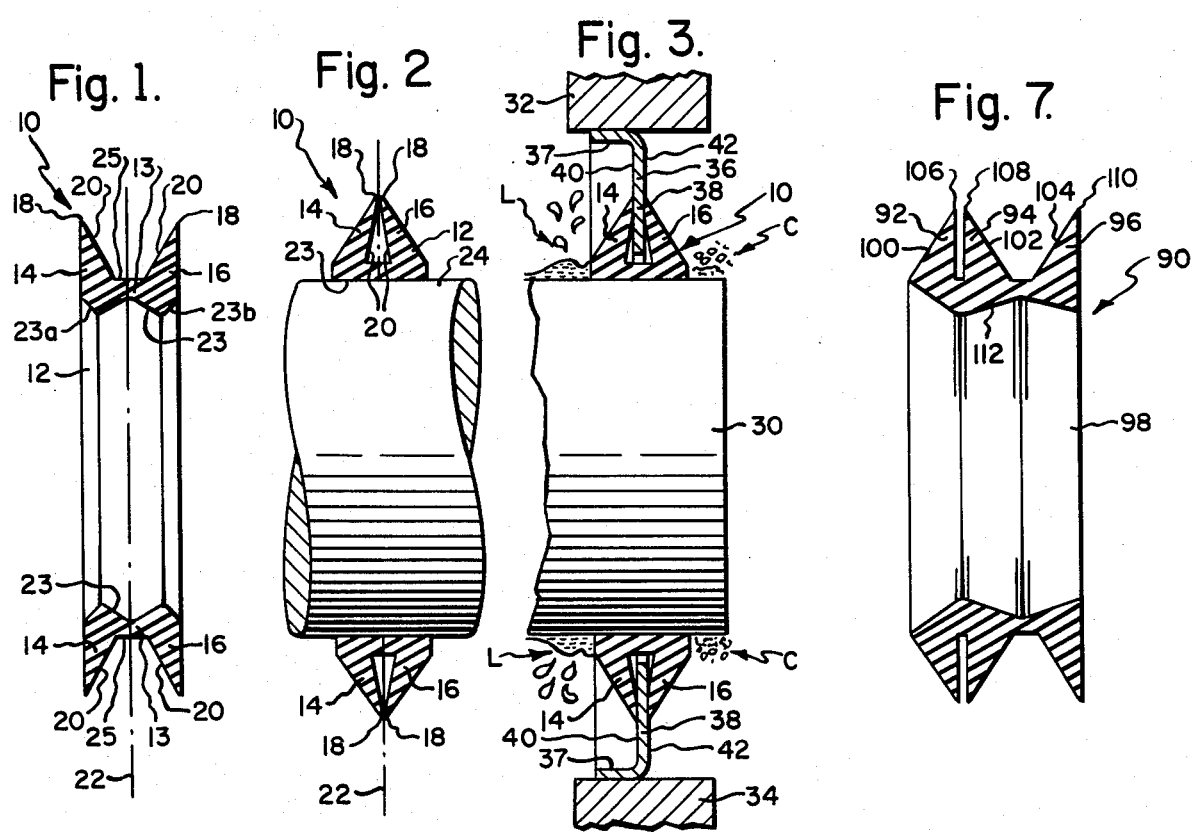
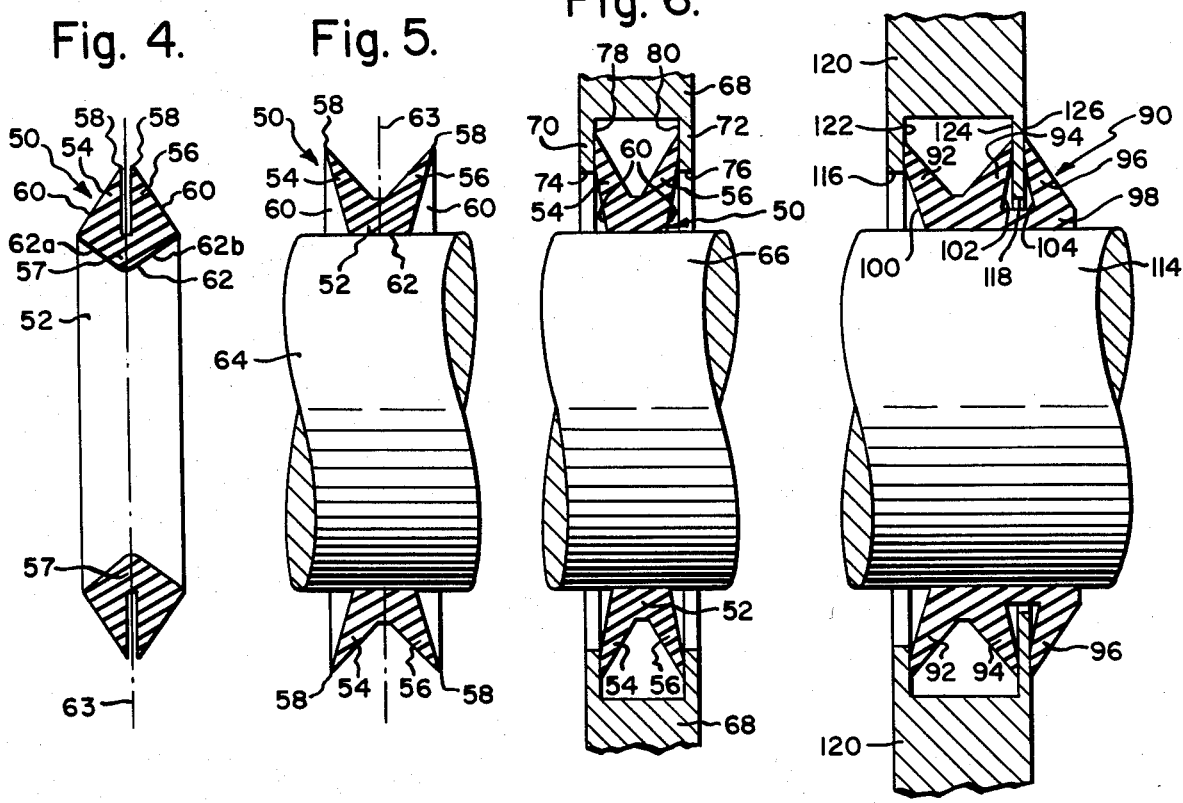

SEAL FOR RELATIVELY ROTATABLE PARTS

BACKGROUND OF THE INVENTION

This invention relates to seal for use between a shaft or rod and close surrounding surfaces, and more particularly to a new and improved seal of such type for retaining fluids and excluding contaminants.

One area of use of the present invention is sealing the clearance in a mechanical apparatus between a shaft and a surrounding member which typically are arranged to rotate relative to one another, although the principles of the present invention can be variously applied. It is commonly desired to seal such a clearance for the purpose of retaining fluids or excluding contaminants. The shaft in such a mechanical apparatus characteristically has a cylindrical surface centered about its longitudinal axis, and the member through which the shaft passes characteristically has a smooth annular counterface or surface which surrounds the shaft.

A conventional seal by which the aforedescribed clearance is sealed is press-fitted upon the shaft and positioned therealong so that is seals axially against the counterface of the surrounding member. If the shaft and member are rotatable relative to one another, the seal rotates, if at all, with the shaft while it maintains continuous contact with the counterface of the member. Sealing is thereby performed by the sealing engagement between the seal and the shaft and between the seal and the member.

It is a general object of the present invention to provide an improved seal for sealing the clearance between an inner member such as a shaft and a circumferential, typically annular surface defined by a surrounding member through which the inner member or shaft passes for retaining fluids and excluding contaminents.

Another object of the present invention is to provide a single seal for sealing the clearance between a shaft and at least two close annular surfaces.

Another object of the present invention is to provide such a seal which, when mounted upon a shaft, enhances the sealing engagement between the seal and the shaft and between the seal and the annular surface through which the shaft passes.

Still another object of this invention is to provide such a seal which effectively retains fluids such as oil and excludes dirt and other contaminents.

Yet still another object of the present invention is to provide such a seal which is low in cost and easy to install.

SUMMARY OF THE INVENTION

This invention resides in a seal for placement upon a shaft and for sealing clearance between the shaft and at least two close annular surfaces of a surrounding structure which defines an opening through which the shaft passes.

The seal is comprised of a ring-like body of stretchable material adapted to be stretched about a shaft and be thereby placed in a deformed condition and in sealing engagement therearound. The body includes a central portion and two lip portions which extend generally radially outwardly of the central portion and are movable in a hinge-like manner. The body is of such cross-sectional shape that when it is stretched from an undeformed condition to a deformed condition about the shaft, each of the lip portions moves from a first angular position to a second angular position relative to a midplane of the body. When the seal is operatively placed about the shaft so that each of the lip portions contacts a corresponding one of the close annular surfaces through which the shaft passes and is thereby prevented from moving to its second angular position, the lip portions are biased into sealing engagement with the annular surfaces.

BRIEF DESCRIPTION OF THE DRAWING FIGURES

FIG. 1 is a cross-sectional view of one embodiment of the seal of this invention shown in an unstretched or undeformed condition prior to installation.

FIG. 2 is a cross-sectional view of the seal of FIG. 1 as it would appear in a stretched or deformed condition installed on a shaft.

FIG. 3 is a cross-sectional view of the seal of FIG. 1 as it would appear in use sealing the mechanical clearance between a shaft and a surrounding structure.

FIG. 4 is a cross-sectional view of a seal according to another embodiment of this invention shown in an unstretched or undeformed condition prior to installation.

FIG. 5 is a cross-sectional view of the seal of FIG. 4 as it would appear in a stretched or deformed condition installed on a shaft.

FIG. 6 is a cross-sectional view of the seal of FIG. 4 as it would appear in use sealing mechanical clearances between a shaft and a surrounding structure.

FIG. 7 is a cross-sectional view of a seal according to still another embodiment of this invention shown in an unstretched or undeformed condition prior to installation.

FIG. 8 is a cross-sectional view of the seal of FIG. 7 as it would appear in use sealing mechanical clearances between a shaft and a surrounding structure.

DETAILED DESCRIPTION OF THE DRAWING FIGURES

FIG. 1 illustrates an embodiment of a seal, generally designated 10, in accordance with the present invention. The seal 10 comprises a ring-like body 12 formed typically by molding and of a suitable elastomeric material which permits the seal 10 to be stretched, in a manner set forth in greater detail hereinafter, into a deformed condition about a shaft when installed for use.

Any of a number of elastomeric material types such as nitriles, polyacrylates, silicones or fluoroelastomers can be used to form the seal 10 and it will be understood that this invention is not limited to one type of elastomeric material, even though one type may be more suited for a particular application than another depending upon various operating factors, such as the temperatures or types of fluids to which the seal is exposed during service. It is believed that a nitrile seal having a durometer of about 63 is well suited for sealing petromium oils and water at temperatures ranging from about $-65°$ F. ($-54°$ C.) to about $250°$ F. ($121°$ C.).

The ring-like body 12 includes a central, annular web-like portion 13 and two annular lip portions 14, 16 which extend radially outwardly from the opposite ends of the central portion 13. Each lip portion 14 or 16 is substantially triangular in cross-section and is formed relative to the central portion 13 to be movable in a hinge-like manner. Each lip portion 14 or 16 defines an outermost edge 18 which is located generally radially outwardly of the body 12, and a substantially smooth, angularly disposed sealing surface 20 extends inwardly from edge 18 toward central portion 13 and a similar sealing surface 20 of the other lip portion. The lip portions 14,16 are arranged on opposite sides of the midplane, indicated 22, of the body so as to be symmetrical thereabout. In the unstretched condition of FIG. 1, the oppositely-disposed axial end faces of lip portions 14,16 are substantially parallel to plane 22. Each sealing surface 20 defines an acute angle, for example about thirty degrees, with plane 22 in the unstretched condition of FIG. 1. Edges 18 are equidistant radially from the center of the ring 12. Central portion 13 has a radially outwardly-facing wall 25 and a radially inwardly-facing wall 23 which, in its FIG. 1 undeformed condition, is substantially V-shaped in cross-section with its V opening radially inwardly of the body 12. The annular inner wall 23 terminates axially inwardly a short distance from the corresponding opposite axial end faces of lip portions 14,16. Angularly disposed annular surfaces 23a,23b are located therebetween.

When the body 12 is stretched from its FIG. 1 undeformed condition to a deformed condition as shown in FIG. 2 about a cylindrical shaft 24, each lip portion 14 or 16 moves from a first angular position relative to the midplane 22 of the body 12 to a second angular position and so that the outermost edges 18,18 are moved into contact with each other. In the FIG. 2 deformed condition of the body 12, the sealing surfaces 20,20 of the lip portions 14,16 are closer to one another, intersecting or contacting at edges 18,18 and the radially inwardly-facing wall 23 of the body 12 is forced to lie substantially flat against and in sealing engagement with the surface of the shaft 24 so as to assume a substantially cylindrical shape. The axial end faces of lip portions 14,16 are disposed at angles to plane 22, for example defining therewith acute angles of about 30 degrees, and the entire outer shape of body 12 is triangle-like. The junction surfaces 23a,23b now are substantially parallel to plane 22. In the condition of FIG. 2 with edges 18 in contact, the surfaces 20 together with the included outer surface 25 of central portion 13 define a closed annular region of triangular cross section with surfaces 20 defining the legs and the surface 25 of portion 13 defining the base of the triangle.

FIG. 3 illustrates an environment in which the seal 10 is utilized including a cylindrical shaft 30 and a housing 32 through which the shaft 30 passes. For purposes of illustration, internal lubricants desired to be retained within the housing 32 are indicated generally L, and external contaminants desired to be prevented from entering the housing 32 are indicated generally C. The housing defines a circular opening 34 in which a cup-shaped member 36 is tightly secured by suitable means. The member 36 is of metal and thin-walled including a cylindrical portion 37 in sealing engagement with the housing 32 and further including a radially inwardly directed annular flange 38 having an opening therein of slightly larger diameter than the shaft 30 and through which the shaft passes. The mechanical clearance sealed by the seal 10 exists between the radially inwardly-directed flange 38 and the shaft 30. The thin, annular flange 38 defines two annular surfaces 40,42 on its opposite sides which are relatively close together. The annular surfaces 40,42 lie in parallel planes which are generally perpendicular to the longitudinal axis of the shaft 30.

In the FIG. 3 environment, the seal body 12 is stretched upon the shaft 30 and positioned therealong so that lip portions 14,16 are positioned on opposite sides of the radially inwardly-directed flange 38 of cup member 36. Each of the smooth sealing surfaces 20,20 of the lip portions, 14,16 contacts a corresponding annular surface 40 or 42 of the member 26, and the lip portions 14,16 are thereby prevented from moving to their completely deformed angular position of FIG. 2. The lip portions 14,16 are therefore axially biased into sealing engagement with the annular surfaces 40,42 and effectively preload the seal 10. The biasing force which one of the lip portions 14 or 16 applies against its corresponding annular surface 40 or 42 is counteracted by the biasing force applied in the opposite axial direction by the other lip portion 16 or 14 so that the seal 10 remains in one position along the length of the shaft during its service life.

In the FIG. 3 environment, the shaft 30 is rotatable relative to the housing 32 and member 36. The seal 10 rotates with the shaft 30 and slings off matter, such as lubricants or contaminants, which migrate to the surface of the lip portions 14 and 16. This slinging action further enhances the effectiveness of the seal to retain lubricants and exclude contaminants.

Another desirable feature of the seal 10 relates to its ease of installation. Commonly, in applications such as is shown in FIG. 3 in which it is desired to seal the mechanical clearance with sealing members in sealing engagement with both of the annular surfaces 40 and 42. two conventional seals are used, and in order to install the two seals, disassembly of the housing or removal of the shaft is required. The seal 10, however, can be easily installed by bending one of its lip portions 14 or 16 in such a manner that its edge 18 is forced through the circular opening 34 of the cup member 36 as the seal 10 is forced along the shaft 30. The bent lip portion conforms to its FIG. 3 condition when the seal 10 is moved to a position, as shown, along the shaft where the seal is centered about the flange 38 of the cup member 36.

FIG. 4 illustrates another embodiment of a seal, generally designated 50, in accordance with the present invention. The seal 50 comprises a ring-like body 52 formed of a stretchable, elastomeric material similar to seal 10 of the preceding embodiment and includes two lip portions 54 and 56 formed relative to a central portion 57 to be movable in the manner of a hinge and extending generally radially outwardly of the body. Each of the lip portions 54 or 56 is substantially triangular in cross-sectional shape, includes an outermost edge 58, and defines a smooth sealing surface 60 on opposite sides of the body 52, as shown. The lip portions 54,56 are arranged on opposite sides of the midplane, indicated 63, of the midplane, indicated 63, of the body so as to be symmetrical thereabout. In the unstretched condition of FIG. 4, the surfaces extending radially inwardly from edges 58 to central portion 57 are closely spaced, oppositely facing, and parallel to the midplane 63. Each sealing surface 60 defines an acute angle, for example about thirty-five degrees, with midplane 63 in the unstretched condition. Edges 58 are equidistant radially from the center of the ring 52. The body 52 defines a radially inwardly-facing wall 62 which in its FIG. 4 undeformed condition is substantially V-shaped in cross-section with its V opening radially outwardly of the body 52. In particular, wall 62 has portions 62a,62b each extending at an angle of about 60 degrees from midplane 63 and terminating at the corresponding axial end face of body 52.

When the body 52 is stretched from its FIG. 4 undeformed condition to a deformed condition as shown in FIG. 5 about a cylindrical shaft 64, each lip portion 54 or 56 moves from a first angular position relative to the midplane of the body 52 to a second angular position and so that the outermost edges 58,58 are moved farther apart. In the FIG. 5 deformed condition of the body 52, the sealing surfaces 60,60 of the lip portions 54,56 are spaced farther apart than they are in the FIG. 4 undeformed condition. Also, the radially inwardly-facing wall 62 of the body 52 is forced to lie substantially flat against and in sealing engagement with the surface of the shaft 64 so as to assume a substantially cylindrical shape. In other words, wall portions 62a and 62b are disposed normal to midplane 63 so that wall 62 is an annular surface of constant diameter.

FIG. 6 illustrates an environment in which the seal 50 is utilized including a cylindrical shaft 66 and a member 68 through which the shaft 66 passes. The member 68 includes two radially inwardly-directed flanges 70 and 72 which define corresponding openings 74 and 76, respectively, of slightly larger diameter than the shaft 66 and through which the shaft 66 passes. The mechanical clearances sealed by the seal 50 exist between the two radially inwardly-directed portions 70,72 of the member 68 and the shaft 66. The radially inwardly-directed portions 70,72 define two annular surfaces 78,80, respectively, which face one another and are relatively close together. The annular surfaces 78,80 lie in parallel planes which are generally perpendicular to the longitudinal axis of the shaft 66.

In the FIG. 6 environment, the seal body 52 is stretched upon the shaft 66 and positioned therealong so that lip portions 54,56 are positioned between the radially inwardly-directed flanges 70,72 of the member 68. Each of the smooth sealing surfaces 60,60 of the lip portions 54,56 contacts a corresponding annular surface 78 or 80 of the member 68 and the lip portions 54,56 are thereby prevented from moving completely to their FIG. 5 deformed second angular position. The lip portions 54,56 are therefore axially biased into sealing engagement with the annular surfaces 78,80 and effectively preload the seal 50. The biasing force which one of the lip portions 54 or 56 applies axially against its corresponding annular surface 78 or 80 is counteracted by the biasing force applied in the opposite axial direction by the other lip portion 56 or 54 so that the seal 50 remains in one positon along the length of the shaft during its service life.

It will be understood that numerous modifications and substitutions may be made to the illustrative embodiments described above without departing from the spirit of the invention. For example, although the embodiments of FIGS. 1-6 have been described as including two lip portions, a seal in accordance with this invention, such as seal 90 of FIG. 7, can have three lip portions 92,94,96 each extending generally radially outwardly of the seal body, indicated 98. The lip portions 92,94,96 are generally triangular in cross section and define sealing surfaces 100,102,104, respectively, and outermost edges 106,108,110, respectively. The seal body 98 is of such cross-sectional shape and defines a radially inwardly-facing wall 112 of such undeformed configuration that when body 98 is stretched about a cylindrical shaft, the outermost edge 106 of the lip portion 92 moves axially to the left as viewed in FIG. 4, the outermost edge 108 of the lip portion 94 moves axially to the right as viewed in FIG. 7, and the outermost edge 110 of the lip portion 96 moves axially to the left as viewed in FIG. 7.

The seal 90 is particularly well-suited for use in the environment depicted in FIG. 8. In the FIG. 8 environment, a cylindrical shaft 114 extends through co-aligned circular openings 116,118 defined by a member 120. The member 120 includes two flanges which define three annular surfaces 122, 124,126 surrounding the shaft 114 and which are relatively close together. The annular surfaces 122,124,126 lie in parallel planes which are generally perpendicular to the longitudinal axis of the shaft 114. When the seal 90 is stretched upon the shaft 114, its inwardly facing wall is forced to lie substantially flat against the surface of the shaft 94. Also, the sealing surfaces 100,102 and 104 of the lip portions 92,94 and 96, respectively, are placed in contact with a corresponding one of the annular surfaces 122,124 and 126, respectively, of the member 100. As a result, the lip portions 92,94 and 96 are axially biased into sealing engagement with the annular surfaces 122,124 and 126, respectively.

It is therefore apparent that the present invention accomplishes its intended objects. While several embodiments of the present invention have been described in detail, that is done for purposes of illustration and not limitation.

I claim:

1. A seal for placement about a shaft and for sealing clearance between the shaft and at least two close annular surfaces each adjacent an opening through which the shaft passes, said seal comprising:

a ring-like body of stretchable material adapted to be stretched about the shaft and be thereby placed in a deformed condition and in sealing engagement therearound, said body including a central portion and at least two lip portions extending generally radially outwardly of said central portion and movable relative thereto in a hinge-like manner, each lip portion defining a radially outermost edge and a sealing surface adjacent said edge for sealingly engaging a corresponding one of the close annular surfaces through which the shaft passes, said sealing surface being relatively short as measured from said outermost edge, said body being of such cross-sectional shape that when it is stretched from an undeformed condition to a deformed condition about the shaft, each one of said lip portions moves from a first angular position to a second angular position relative to another one of said lip portions of said body so that when said seal is operatively placed about the shaft so that the sealing surface of each of said lip portions contacts a corresponding one of the close annular surfaces through which the shaft passes and each lip portion is thereby prevented from moving to its said second angular position, said lip portions are biased into sealing engagement with the annular surfaces.

2. A seal as defined in claim 1 wherein there are two lip portions.

3. A seal as defined in claim 1 wherein said body is formed of an elastomeric material.

4. A seal as defined in claim 1 wherein said body defines a through-opening through which the shaft is received when stretched thereabout, said through-opening having a central axis, there are two lip portions and said body is symmetrical about a midplane oriented generally perpendicular to said central axis of said body through-opening.

5. A seal as defined in claim 1 wherein said sealing surface of each of said lip portions for contacting a corresponding one of the annular surfaces is smooth.

6. A seal as defined in claim 1 wherein there are two lip portions and said body is of such cross-sectional shape that when said body is stretched from an undeformed condition to a deformed condition about the shaft, said radially outermost edges of said lip portions are moved farther apart.

7. A seal as defined in claim 1 wherein there are two lip portions and said body is of such cross-sectional shape that when said body is stretched from an undeformed condition to a deformed condition about the shaft, said radially outermost edges of said lip portions are moved closer together.

8. A seal as defined in claim 1 wherein said body defines a radially inwardly-facing wall which when said body is in its undeformed condition is of non-cylindrical configuration and which when said body is its deformed condition upon the shaft is forced by the shaft into a substantially cylindrical configuration.

9. A seal as defined in claim 8 wherein said radially inwardly-facing wall includes a portion which is substantially v-shaped in cross section with its V opening radially inwardly.

10. A seal as defined in claim 8 wherein said radially inwardly-facing wall is substantially V-shaped in cross section with its V opening radially outwardly.

11. A seal for placement about a shaft and for sealing clearance between the shaft and at least two close annular surfaces each adjacent an opening through which the shaft passes, the seal comprising:
a ring-like body of stretchable material adapted to be stretched about the shaft when placed thereon and including a central portion and at least two annular lip portions extending generally radially outwardly of said central portion and movable relative thereto in a hinge-like manner, each lip portion defining a radially outermost edge and a sealing surface adjacent said edge for engaging a corresponding one of the close annular surfaces through which the shaft passes, each of the sealing surfaces being relatively short as measured from its said outermost edge, said body when in its undeformed condition defining a radially inwardly-facing wall of such configuration and of such cross-sectional shape that when said body is stretched from an undeformed condition to a deformed condition about the shaft, said radially inwardly-facing wall is forced generally flat against the shaft and each one of the lip portions moves from a first angular position to a second angular position relative to another one of said lip portions of said body so that when said seal is placed upon the shaft so that the sealing surface of each of said lip portions contacts a corresponding one of the close annular surfaces through which the shaft passes and each lip portion is thereby prevented from moving to its said second angular position, said lip portions are biased into sealing engagement with the annular surfaces.

12. A seal as defined in claim 11 wherein there are two lip portions and said body is of such cross-sectional shape that when said body is stretched from an undeformed condition to a deformed condition about the shaft, said radially outermost edges of said lip portions are moved farther apart.

13. A seal as defined in claim 11 wherein there are two lip portions and said body is of such cross-sectional shape that when said body is stretched from an undeformed condition to a deformed condition about the shaft, said radially outermost edges of said lip portions are moved closer together.

14. In combination:
a shaft having a cylindrical surface;
means defining at least two close annular surfaces each defining an opening through which said shaft passes and continuous with another annular surface; and
a seal in the form of a ring-like body of stretchable material stretched about the surface of said shaft and in sealing engagement therewith, said body including a central portion and at least two lip portions extending radially outwardly of said central portion and hingedly movable relative thereto, each of said lip portions defining a radially outermost edge and a sealing surface adjacent said edge, each of the sealing surfaces being relatively short as measured from its said outermost edge and being biased into sealing engagement with a corresponding one of said close annular surfaces by the stretched condition of said body so that said close annular surfaces and said lip portions collectively define an annular lubricant-trapping cavity between opposite sides of said seal.

15. The combination of claim 14 wherein the biasing forces of said lip portions act axially along the shaft and the biasing force of one lip portion acts in an axial direction opposite the direction in which the biasing force of another lip portion acts.

16. The combination of claim 14 wherein said annular surfaces are substantially parallel to one another in planes which are substantially perpendicular to the longitudinal axis of said shaft.

17. The combination of claim 14 wherein said means defining said annular surfaces includes a member having a radially inwardly-directed flange surrounding said shaft and two of said annular surfaces are provided by opposite sides of said flange.

18. The combination of claim 14 wherein said means defining said annular surfaces includes a member having two close radially inwardly-directed flanges surrounding said shaft and substantially parallel to one another in planes substantially perpendicular to the longitudinal axis of said shaft, and two of said annular surfaces are provided by the flange sides which face one another.

19. The combination of claim 14 wherein there are two lip portions and said body is of such cross-sectional shape that when said body is stretched from an undeformed condition to a deformed condition about said shaft, said radially outermost edges of said lip portions are moved farther apart.

20. The combination of claim 14 wherein there are two lip portions and said body is of such cross-sectional shape that when said body is stretched from an undeformed condition to a deformed condition about said shaft, said radially outermost edges of said lip portions are moved closer together.

21. A seal as defined in claim 1 wherein each of said lip portions is substantially triangular in cross section.

22. A seal as defined in claim 2 wherein said central portion is web-like and said lip portions extend radially outwardly from the opposite ends of said central portion.

23. A seal as defined in claim 7 wherein said sealing surfaces of said lip portions, when said seal is in an undeformed condition, define an angle of about sixty degrees with one another as measured in a cross section taken about a plane including the axial centerline of said seal body.

* * * * *